(12) United States Patent
Herron

(10) Patent No.: US 7,583,837 B2
(45) Date of Patent: Sep. 1, 2009

(54) METHOD AND SYSTEM FOR PREPARING GRAYSCALE IMAGE FILES FOR HIGHLIGHT PRINTING ON A FOUR COLOR PRINTER

(75) Inventor: Stephen K. Herron, Orilla (CA)

(73) Assignee: Xerox Corporation, Norwalk, CT (US)

( * ) Notice: Subject to any disclaimer, the term of this patent is extended or adjusted under 35 U.S.C. 154(b) by 1069 days.

(21) Appl. No.: 10/758,618

(22) Filed: Jan. 15, 2004
(Under 37 CFR 1.47)

(65) Prior Publication Data

US 2005/0157921 A1    Jul. 21, 2005

(51) Int. Cl.
*G06K 9/00* (2006.01)
*G09G 5/02* (2006.01)
*H04N 1/40* (2006.01)

(52) U.S. Cl. .................. 382/162; 382/254; 345/596; 345/690; 358/3.01

(58) Field of Classification Search ......... 382/162–169, 382/254, 274, 276; 345/596, 690–697; 358/518–523, 358/3.01–3.23, 3.24
See application file for complete search history.

(56) References Cited

U.S. PATENT DOCUMENTS

| 5,050,984 | A | * | 9/1991 | Geshwind | 352/38 |
| 5,146,346 | A | | 9/1992 | Knoll | |
| 5,237,517 | A | | 8/1993 | Harrington et al. | |
| 5,909,291 | A | | 6/1999 | Myers et al. | |
| 5,982,924 | A | | 11/1999 | Power et al. | |
| 6,058,207 | A | * | 5/2000 | Tuijn et al. | 382/162 |
| 6,185,013 | B1 | * | 2/2001 | Harrington et al. | 358/520 |
| 6,225,974 | B1 | * | 5/2001 | Marsden et al. | 345/590 |
| 6,459,501 | B1 | * | 10/2002 | Holmes | 359/1.9 |
| 6,542,634 | B1 | | 4/2003 | Ohga | |
| 6,646,763 | B1 | * | 11/2003 | Estrada | 358/1.9 |
| 6,754,399 | B2 | * | 6/2004 | Pettigrew et al. | 382/276 |
| 6,775,408 | B1 | * | 8/2004 | Masaki | 382/167 |

* cited by examiner

*Primary Examiner*—Daniel G Mariam
*Assistant Examiner*—Manav Seth
(74) *Attorney, Agent, or Firm*—Maginot, Moore & Beck LLP

(57) ABSTRACT

A system converts grayscale image data into device independent image data that mimics highlight printing of the grayscale image at a full color printer. The system is preferably implemented in a plug-in for a document control program so a data object associated with the document control program may be used to generate device independent color space data from the grayscale data. A data converter uses a device independent profile to convert the device independent color space data to a second device independent color space that corresponds to a selected highlight for printing. When a device dependent profile associated with a printing station converts the second device independent color space data for printing, the resulting four color data emulates highlight printing of the original grayscale image. Thus, a full color printer may be used for grayscale printing, duotone printing, and full color printing without requiring tone or ink changes.

15 Claims, 2 Drawing Sheets

*FIG. 2*
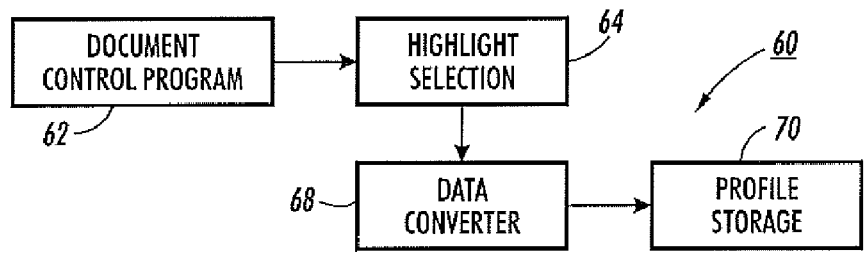
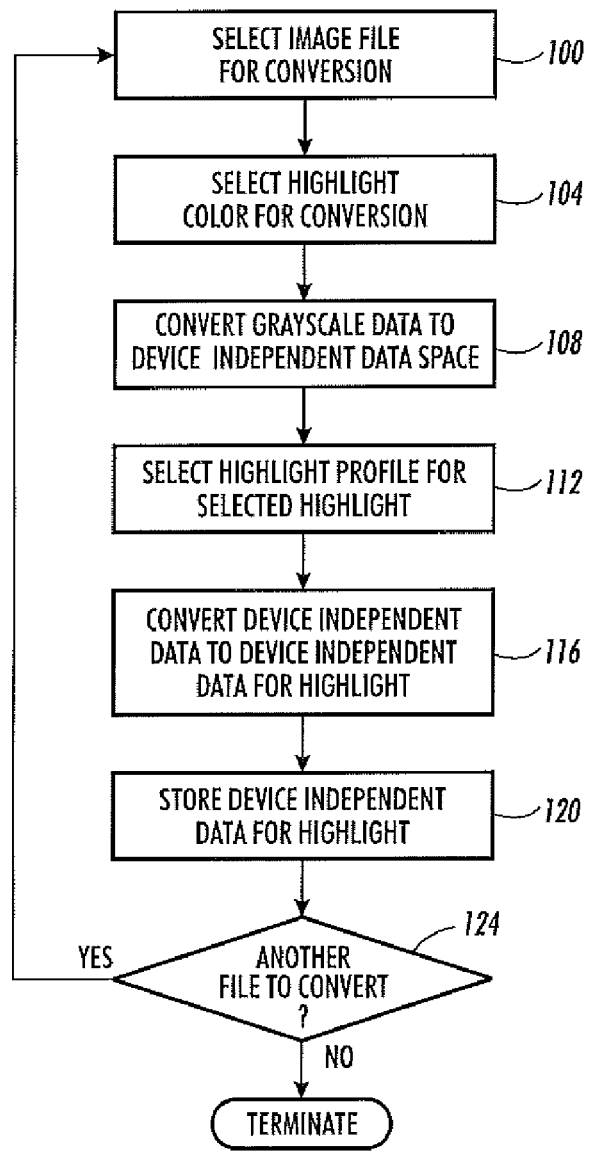
*FIG. 3*

METHOD AND SYSTEM FOR PREPARING GRAYSCALE IMAGE FILES FOR HIGHLIGHT PRINTING ON A FOUR COLOR PRINTER

FIELD OF THE INVENTION

The present invention relates generally to image conversion systems for printers, and more particularly, to systems that convert grayscale images to color images for color printing.

BACKGROUND OF THE INVENTION

Print shops or companies that operate internal publication operations look for ways to reduce expenses associated with the reproduction of documents for the company or customers. One area that impacts expenses is the ability to be able to print both grayscale and color documents. Grayscale documents are typically printed by printing pixels of different densities of black ink on white paper. The density of the ink or toner for a pixel is defined by a binary value for the pixel. Color documents may be generated by printing pixels of different densities of at least two colors of ink or toner. When the pixels are formed from black ink and another color of ink, the color documents are typically called duotone or highlight documents. Sometimes duotone documents also refer to documents having pixels comprised of two colored inks and a black ink. Full color documents are comprised of pixels having four different colored inks. Typically, these four inks are cyan, magenta, yellow, and black and the printers used to produce full color documents are known as CMYK or four color printers.

Colored documents are more expensive to generate than grayscale documents because more than one colorant is required and the size of each color component in pixel must be determined and generated during the printing process. Control of the printer to apply the inks in these measured amounts to achieve the correct coloring for perception by the human eye requires precise control. Consequently, color printers are more expensive than grayscale printers and full-color printers are more expensive than duotone or highlight printers. Thus, one way in which printing operations may control costs is to purchase and use only grayscale or duotone printers. While duotone printers do not provide full-color capability, they do provide for the provision of some color in documents and at the same time support grayscale printing. Thus, only one type of printer is required to print both grayscale and limited color documents and some printing operations elect to forgo full color printers as a result.

For printing operations that need to print full color images, a full color printer is required. A full color printer may also be used to generate grayscale images since the black channel of a CMYK printer may be used alone to generate grayscale images. However, full color printers may not be used to generate duotone documents because rarely are the one or two colored inks used for duotone images one of the cyan, magenta, or yellow inks used in a typical four color printer. As duotone printing is adequate for many color applications, some printing operations relay on a duotone printer alone to support both grayscale and duotone printing.

To enhance the capability of duotone printers, numerous attempts have been made to map full color hues and shades to duotone printer color spaces. While a number of these schemes are somewhat successful, none can exactly match full color images with the duotone process because the gamut of colors possible with the CMYK process is larger than the gamut of possible colors with the duotone process. Consequently, some different hues and shades from a full color image are mapped to the same duotone hue and shade and color detail is lost. Consequently, many printing operations try to meet the need for grayscale, duotone, and full color documents with a duotone printer that is capable of converting full color images to duotone images, although full color images cannot be truly replicated on a duotone printer.

There is a need, therefore, for a system and method that prints grayscale, duotone, and true full color images with a single printer.

SUMMARY OF THE INVENTION

The present invention addresses the above need, as well as others, by providing a method for converting grayscale image files to device independent color space files that map duotone hues and shades to CMYK values. This method enables CMYK printers to truly mimic duotone images yet retain the capability for production of four color images when required. As a result, a full color printer is capable of providing grayscale, duotone, and full color images.

An exemplary method of image file management includes selecting a highlight color and converting grayscale data to device independent color space data corresponding to the selected highlight color. Preferably, the device independent color space data corresponding to the selected highlight color may be converted by a profile for the CMYK printer so that the CMYK printer mimics the selected highlight. Most CMYK printers have a plurality of profiles for converting device independent color space data to four channel data for the CMYK printer. By converting the grayscale data to a device independent color space for which the CMYK printer has a profile, the CMYK printer is enabled to print a four color image that closely emulates a duotone image.

Preferably, the grayscale data is converted to a first device independent color space data and then converted to a second device independent color space data that corresponds to the selected highlight. This component of the process is done to take advantage of existing image profiles for converting grayscale images to known device independent color spaces. By doing so, the profile for converting image data to a device independent color space is not required to compensate for abnormalities for the device that generated the grayscale image. Thus, the method of the present invention preferably converts from one device independent color space to another device independent color space so that the device dependent profiles that convert data for the grayscale generating device and for the CMYK printer may be used. Accordingly, the profile of the present invention takes advantage of the profiles at the image generating and image printing devices that were derived to compensate for device dependent idiosyncrasies. The profile of the present invention contributes a profile constructed to convert data into device independent data that corresponds to a hue triangle for a selected highlight or duotone color.

A system for performing an implementation of an exemplary method of duotone printing on a full color printer includes a highlight selector for selecting a highlight and a file converter for converting the grayscale data to device independent color space data. The file selector is preferably a plug-in application that may be used to select a document having image data, such as a file having a .pdf or .tif extension as well as the highlight in which the grayscale data is to be printed. By using a plug-in application, the file selector may be integrated with known image document programs such as Adobe Photoshop or Adobe Acrobat, both of which are available from Adobe Systems, Inc. of San Jose, Calif. These image document programs support grayscale images within documents and include an internal object for converting grayscale images to a device independent color space, such as CIE XYZ space. By using this internal object, the system of the present invention is able to obtain device independent color space data for the grayscale data comprising the image.

The plug-in application that may be used to implement the highlight selector may also provide a data converter that uses a custom profile for converting the device independent color space data generated by the internal object to device independent color space data that describes the selected highlight. Preferably, a custom profile is provided for each highlight supported by the system of the present invention. The device independent color space data generated with the custom profile may be used by a profile associated with a full color printer to generate CMYK color space data. The resulting CMYK color space data uses the four colored inks or toners of the full color printer to mimic a duotone print comprised of a highlight toner with black toner. Thus, the system of the present invention enables a full color printer to generate grayscale, duotone, and full color images.

Preferably, the custom profiles convert CIE XYZ color space data into calibrated RGB color space data. This form of RGB color space data is not device specific such as the RGB data that is used to drive color monitors and other display devices. Thus, the color space data remains device independent so it transports well to different color printer platforms. If the document program uses profiles to convert the grayscale image data to other device independent color spaces, such as CIE L*a*b or CIE L*u*v, then the custom profiles for each highlight must be adjusted to accept the device independent color space data generated by the grayscale converting profiles of the document program. While the device independent color space data generated with the custom profiles is preferred to be calibrated RGB data, any other known device independent color space data may be generated as long as it differs from the type of device independent color space data being converted with the profile.

The above described features and advantages, as well as others, will become more readily apparent to those of ordinary skill in the art by reference to the following detailed description and accompanying drawings.

BRIEF DESCRIPTION OF THE DRAWINGS

FIG. 2 shows a block diagram of a system for converting grayscale image files to device independent color space data files that mimic highlight printing colors; and FIG. 3 is a flow diagram of an exemplary method for converting grayscale image files in the system of FIG. 1.

DETAILED DESCRIPTION

Figure 1:
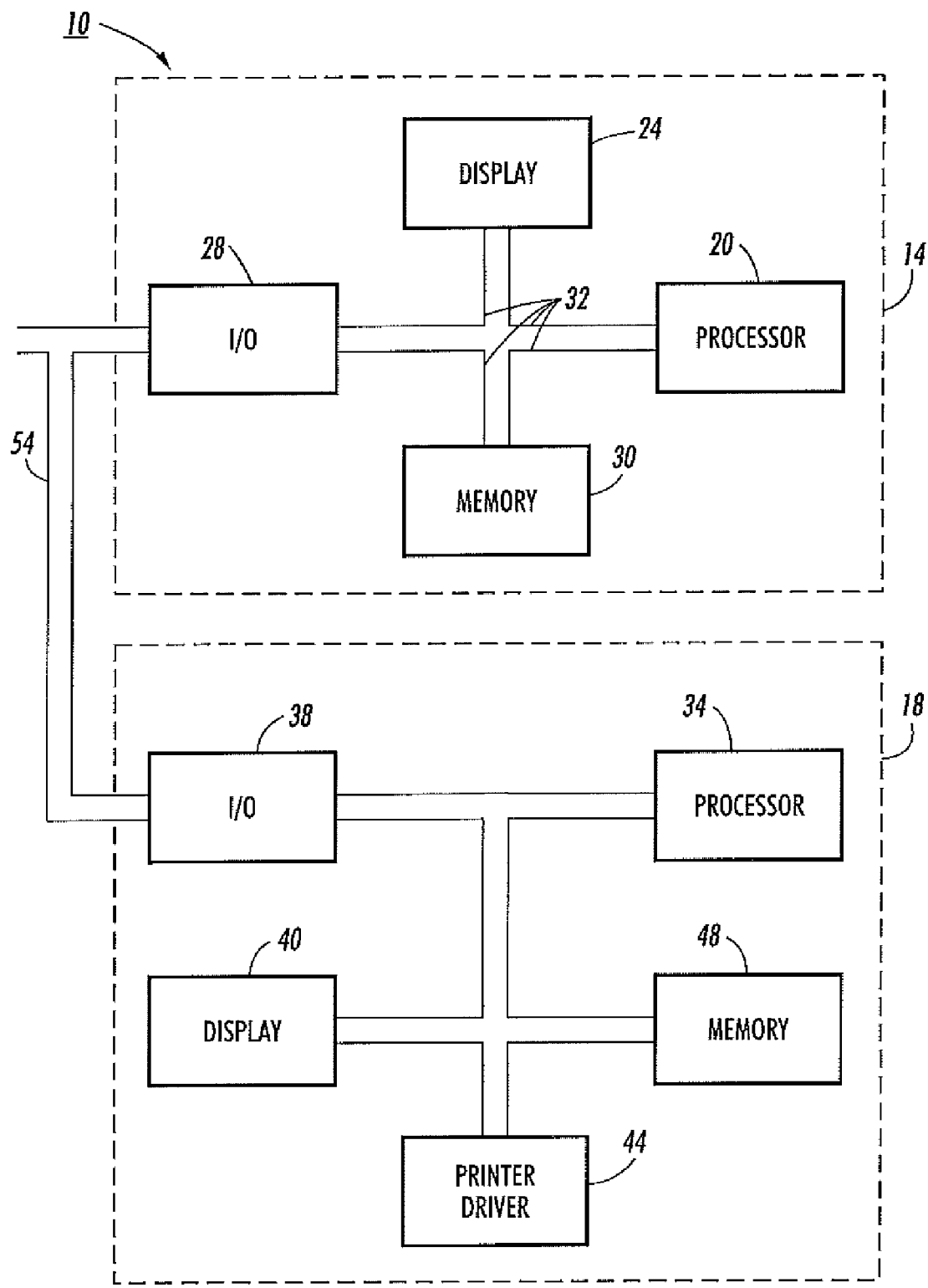
FIG. 1 shows a block diagram of a system in which the image file converting method may be implemented.

FIG. 1 shows a system 10 in which the principles of the present invention may be implemented. System 10 includes a document control station 14 and a full color printing station 18 that are coupled together through a communication link such as a network 54 or the like. Document control station 14 may include a processor 20, a display 24, an input/output (I/O) control circuit 28, and memory 30 that are coupled to one another through a bus 32. Processor 20 executes programs that may be stored in memory 30 and may communicate with a user through display 24. I/O circuit 28 controls I/O operations under the direct or indirect control of processor 20. One of the I/O tasks for I/O circuit 28 is communication with external devices, such as printing station 18, through network 54. Documents processed by document station 14 may be received from an input station over network 54 or an internal bus and stored in memory 30 for processing. Documents processed by station 14 may be returned for storage or further handling to external devices through I/O circuit 28. Document station 14 may be implemented by a Pentium processor having at least 128 MB of RAM coupled to a display of 800×600 pixels.

Full color printing station 18 includes a processor 34, an I/O circuit 38, a display 40, a printer driver 44, and memory 48. Processor 34 executes programs that may be stored in memory 48 and may communicate with a user through display 40. I/O circuit 38 controls I/O operations under the direct or indirect control of processor 34. One of the I/O tasks for I/O circuit 38 is communication with external devices, such as document control station 14, through network 54. Documents printed by printer 18 may be received over network 54 via I/O circuit 38 and stored in memory 48 for printing. Printer 18 may be implemented by a Pentium processor having at least 128 MB of RAM coupled to a display of 800×600 pixels. Although FIG. 1 shows document control station 14 and printer 18 as separate entities coupled by a network, they may be integrated into a single system. Such integration is well known within the printing industry.

As shown in FIG. 2, a system 60 that may be used to implement the principles of the present invention may be comprised of a document control program 62, a highlight selector 64, a grayscale data converter 68, and a profile store 70. Document control program may be any known document control program that may be used to generate, modify, and maintain documents containing image data. Examples of such programs include the Adobe Acrobat program or the Adobe Photoshop program, both of which are available from Adobe Systems, Inc. of San Jose, Calif. Preferably, highlight selector 64, data converter 68, and profile store 70 are implemented with a plug-in application for document control program 62, although other application program forms that communicate with an application program such as document control program 62 may be used. Highlight selector 64 communicates with a user through document control program 62 to enable a user to select a grayscale image file for conversion and to select a highlight for duotone printing of the converted image. Grayscale converter 68 converts the selected grayscale image data to device independent color space data. Converter 68 uses a profile maintained in profile store 70 to convert the grayscale data to device independent color space data that supports the selected highlight.

Devices that generate color displays and/or color printed documents do not provide color in the same way. That is, data used to generate a color document, for example, at one printer cannot be used to generate an exact copy of the document at a second printer because of differences between components, inks, toners, and the like. Efforts have been made to standardize color space so that analytical adjustments may be made to data from one document generator to another without operator intervention. These efforts have resulted in several standardized color spaces, each having advantages and deficiencies. These standardized color spaces are intended to be device independent, which means that a set of coordinates in one of these color spaces on a first machine should, theoretically, produce the same color on a second machine. Among these standardized color spaces are CIE XYX, CIE L*a*b, and CIE L*u*v. Although attempts were made to define these spaces so they describe gradations of color in a linear manner to simplify the transformations between spaces, the actual geometries of these spaces are not always linear for all colors. RBG is used to describe a color triangle of additive colors that may be used to describe the color characteristics of a machine. When it is used as a color space for a machine, RBG color space is not device independent. However, a calorimetric or calibrated RGB color space was developed to describe color in analytical terms with respect to other standardized color spaces. Thus, calorimetric or calibrated RGB color space is device independent.

Transformation equations, usually in the form of matrices, may be developed to map coordinates from one color space into another color space. When one of the color spaces is device dependent, then the transformation equations require factors to compensate for machine abnormalities in the output for a color. However, when coordinates from one standardized color space are transformed to another standardized color space, the transformation equations describe the translation of the axes between the two color spaces. Using these equations, any set of coordinates in a first device independent color space may be converted to another set of coordinates in a second device independent color space.

Most full color printing stations include one or more profiles for converting image files from a device independent color space to a color space that conforms to the color space generated by the printer of the station. Typically, these profiles are implemented as look-up tables where the index into the table is a set of coordinates for a device independent color space or a hashing code generated from a set of coordinates for a device independent color space. The value retrieved from the look-up table at the indexed location is a set of corresponding coordinates in the device dependent color space. In this manner, device independent color space coordinates are translated to the device dependent color space for the mapping of color so that a generated color image is relatively close to the original color image. Alternatively, transformation equations may be used to compute the device dependent coordinates but this method is generally computationally intensive and requires more time than most users can tolerate. Most printing stations, therefore, have profiles for commonly occurring standardized device independent color spaces that convert sets of coordinates for standardized device independent color spaces to sets of coordinates for the device dependent color space corresponding to a printing station.

Most standardized device independent color spaces were developed to support the mapping of color images to less robust device dependent spaces. For example, a commonly encountered problem is the reproduction of full color images on printing machines that use less color inks or toners to generate images than contained in the original color image. This situation most frequently occurs when full color images are printed on highlight or duotone printers. Because the highlight printer cannot exactly reproduce all of the color variations in the original image, different color points in the color space of the original color image may be mapped to the same color point in the highlight color space. Thus, various systems have been developed to better map full color points into a more limited color space such as a duotone or highlight color space.

Current document control programs do support the generation of CMYK color space data from grayscale data but this is an arbitrary mapping since the original image does not contain color data. Typically, these known document control programs convert grayscale image data to one of the standardized device independent color spaces so that the device independent color data may be converted to the color space for the image generating device at the time of image generation. However, there have been no known efforts to translate grayscale images into full color CMYK color space so that the resulting image mimics the look of a highlight or duotone color image of the grayscale image. Nevertheless, the present invention has been developed with an eye towards this level of compatibility so that full color printers may be enabled to support grayscale, duotone, and full color image reproduction. Specifically, grayscale image reproduction is supported by generating pixel data for the black or K channel alone of the full color printer while full color image reproduction is performed in the standard manner as well. The system and method of the present invention also enable the printer to generate CMYK data that replicates the look of a duotone or highlight printer using the highlight specifically selected for a grayscale image by a user. Thus, the system and method of the present invention enable the printing of duotone images at a full color printing station in a wide range of highlight combinations without requiring any change in the four colored toners or inks used by a full color printer.

An exemplary method for implementing the principles of the present invention is shown in FIG. 3. The method includes selecting an image file for conversion (block 100). The file may be selected by using a document control program to communicate with a user. The process also enables the user to select a highlight for the output image to be generated from the selected grayscale image data file (block 104). The grayscale data of the selected image file is converted to a first device independent color space (block 108). Preferably, this conversion is performed using a known object of a document control program that converts grayscale image data into a device independent color space such as CIE XYZ. The profile for converting data to the highlight scheme is selected (block 112) and the first device independent color space data is converted to the second device independent color space in accordance with the profile corresponding to the selected highlight (block 116). The converted image data file may then be stored or printed (block 120). If any other grayscale files were selected for conversion (block 124), the process continues for each file until all of the files are converted.

The exemplary process described with respect to FIG. 3 converts the grayscale image data to a first device independent color space before converting that color space data to a second device independent color space that mimics the selected highlight. This is done to take advantage of many existing grayscale conversion data objects that generate device independent color space data from grayscale data. A profile that generates device independent color space data that mimics a particular highlight may be generated by empirically experimenting with a color printer until it generates a test image containing the gamut of color possible with a particular highlight. The CMYK data for the selected setting may then be inverse transformed to a selected device independent color space. Once a device independent color space is reached, known transformation equations may be used to generate a profile for mimicking the highlight tones at the full color printer with CMYK data. Subsequent highlights may be selected and corresponding profiles developed. In this manner, a full color printer may be enabled to support a plurality of highlight image generating modes.

In operation, a full color printer is operated to empirically generate CMYK images that support the color gamut of a highlight image and the corresponding profiles developed. These profiles may then be integrated with a file converter and highlight selector in a plug-in application or other application that may be implemented in Java, C, C++, Active X, PostScript, or other application languages. The plug-in or other application program may be integrated with a document control program or as part of an operating system library. Using the highlight selector, a user may select a file and a highlight for generating a highlight image of the grayscale image. The conversion process may then convert the grayscale image data file to a device independent color space data file for storage or transmission to a printing station. At a printing station, the device independent color space data may be converted to CMYK data by a device dependent color space profile associated with the full-color printer so the printer may generate a highlight image of the original grayscale image. The user may select other highlights for the grayscale image if other looks are desired and the process repeated.

While the present invention has been illustrated by the description of exemplary processes and system components, and while the various processes and components have been described in considerable detail, applicant does not intend to restrict or in any limit the scope of the appended claims to such detail. Additional advantages and modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A method for generating highlight image data from grayscale image data comprising:
    selecting a highlight for conversion of grayscale image data;
    selecting a grayscale image file for generation of device independent color space data;
    generating device independent color space data from grayscale data of the selected grayscale image file, the device independent color space data corresponding to the selected highlight; and
    printing the device independent color space data with a full color printing station.

2. The method of claim 1, the highlight selection further comprising:
    using a document plug-in program to select the highlight.

3. The method of claim 1, the device independent color space data generation further comprising:
    generating first device independent color space data from the grayscale image data; and
    generating second device independent color space data from the first device independent color space data, the second device independent color space data corresponding to the selected highlight.

4. The method of claim 3, the first device independent color space data generation further comprising:
    converting the grayscale data to the first device independent color space in accordance with a device dependent profile.

5. The method of claim 4, the second device independent color space data generation further comprising:
    converting the first device independent color space data to second device independent color space data in accordance with a device independent profile.

6. The method of claim 5 wherein the device dependent profile is for converting grayscale data to CIE XYZ color space data and the device independent profile is for converting CIE XYZ color space data to calibrated RGB color space data.

7. A system for generating highlight image data from grayscale image data comprising:
    a highlight selector for selecting a highlight for conversion of grayscale image data;
    a data converter for generating first device independent color space data from grayscale data; and
    a full color printing station that receives the first device independent color space data and generates second device independent color space data that corresponds to the selected highlight.

8. The system of claim 7, the highlight selector further comprising:
    a document plug-in program to select the highlight.

9. The system of claim 7 wherein the highlight selector selects a grayscale image file for generation of the device independent color space data corresponding to the selected highlight.

10. The system of claim 7, the data converter further comprising:
    a data object for generating the first device independent color space data from the grayscale image data.

11. The system of claim 10 wherein the full color printing station generates the second device independent color space data from the first device independent color space data with a device independent profile corresponding to the selected highlight.

12. The system of claim 10, the data converter further comprising:
    a device dependent profile for converting the grayscale data to the first device independent color space.

13. The system of claim 11
    the device independent profile being a look-up table stored in the full color printing station.

14. The system of claim 11 wherein the device dependent profile is for converting grayscale data to CIE XYZ color space data.

15. The system of claim 12 wherein the device independent profile is for converting CIE XYZ color space data to calibrated RGB color space data.

* * * * *